Dec. 22, 1925.
J. SPENCE
1,566,992
CUTTER ATTACHMENT FOR TRACTORS
Filed Feb. 27, 1925    2 Sheets-Sheet 2
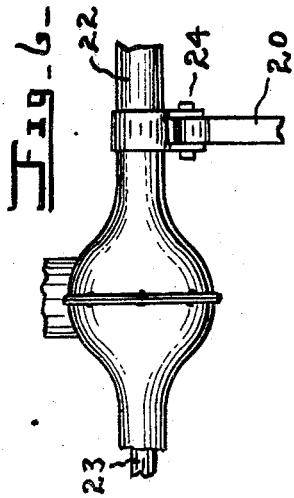
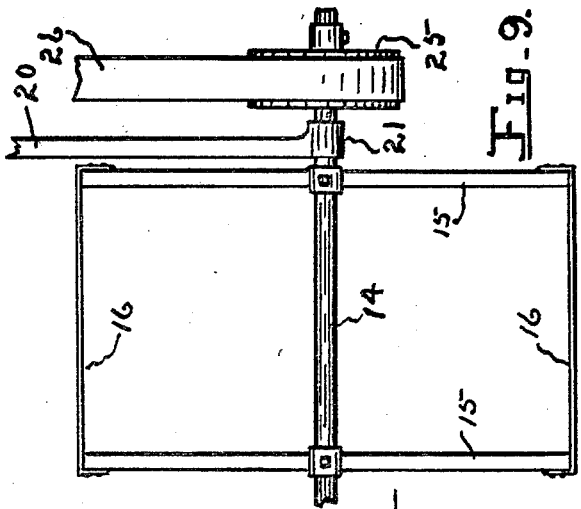
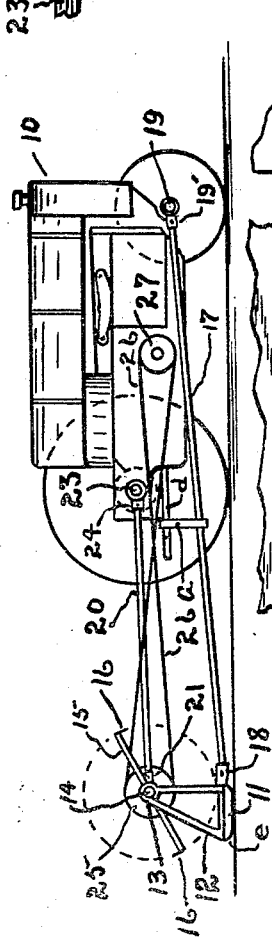
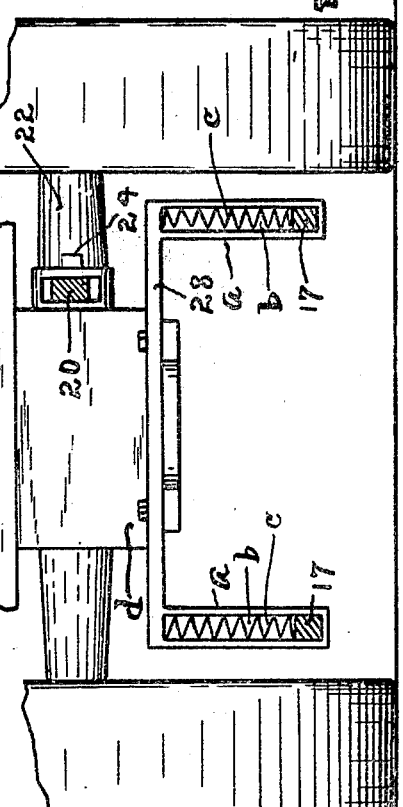
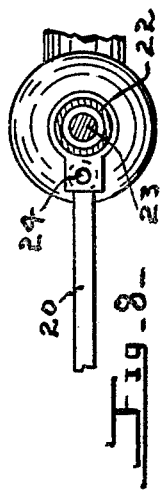
Inventor
Joseph Spence
Hiram K. Sturges
Attorney Patented Dec. 22, 1925.

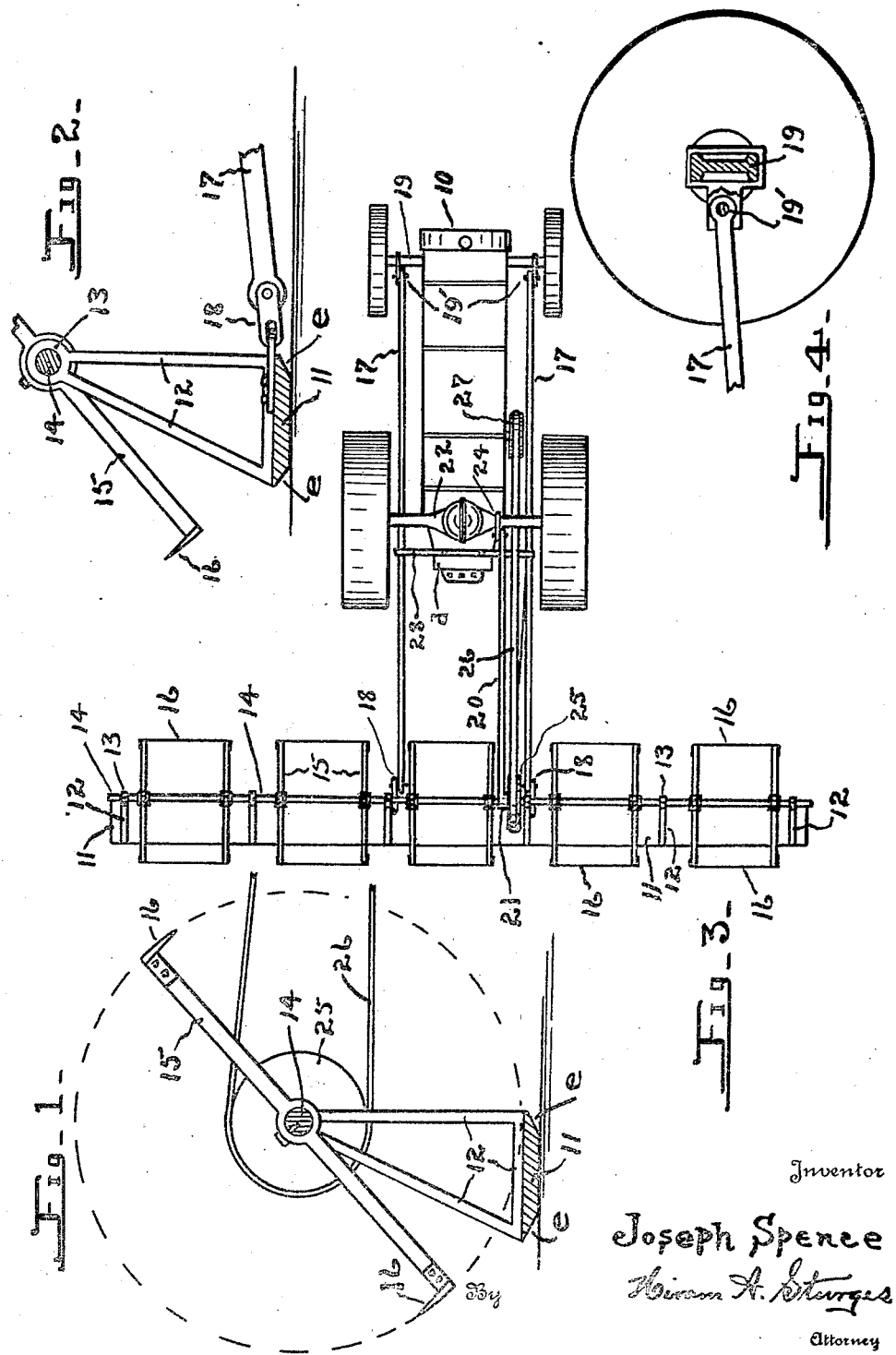

1,566,992

UNITED STATES PATENT OFFICE.

JOSEPH SPENCE, OF MAYWOOD, NEBRASKA.

CUTTER ATTACHMENT FOR TRACTORS.

Application filed February 27, 1925. Serial No. 12,131.

*To all whom it may concern:*

Be it known that I, JOSEPH SPENCE, citizen of the United States, residing at Maywood, in the county of Frontier and State of Nebraska, have invented certain new and useful Improvements in Cutter Attachments for Tractors, of which the following is a specification.

This invention relates to an attachment for use in connection with a tractor for cutting stubble or rows of corn stalks in a field, and has for its object, broadly, to provide a cutting implement which will be convenient in use, may be economically manufactured, and will be adapted to cut several rows of stalks by a single travel across a field when moved and actuated by a tractor.

The invention includes a base-plate on which the cutters, their rotatable shaft and frames are mounted, and also includes means on the base-plate and shaft, connected with the tractor, for maintaining the device in an upright position while in operation.

With the foregoing objects in view and others to be mentioned, the invention presents a novel and useful construction, combination and arrangement of parts as described herein and claimed, and as illustrated in the drawings, wherein,—

Fig. 1 is an end view of an upright frame, a rotatable shaft and pair of cutter-bars or blade-arms, the base-plate and shaft being in section. Fig. 2 is a broken away, sectional view showing a pull-bar pivotally connected with the base-plate. Fig. 3 is a plan view of a cutter attachment for tractors embodying the invention. Fig. 4 illustrates the pivotal connection of a pull-bar with a front axle of a tractor, said axle being in section. Fig. 5 is a side view of parts shown in Fig. 3. Fig. 6 is a plan view showing a pivotal mounting of a radius rod on the housing of the rear axle of the tractor. Fig. 7 is a broken away view showing a yoke on the rear part of the tractor for supporting a pair of pull-bars, said pull-bars and radius rod being in section. Fig. 8 illustrates the pivotal mounting of the radius rod on the rear axle of the tractor, said axle and housing being in transverse section. Fig. 9 is a plan view of a revoluble shaft, a pair of cutter bars movable therewith, a radius rod journaled on said shaft and a pulley fixed on the shaft.

Referring now to the drawing, the invention is shown and described in connection with a tractor 10 of ordinary construction, and in order that the objects mentioned may be accomplished practically and economically I provide a base plate 11 having a length sufficient to mount thereon a plurality of upright frames 12, said frames being disposed in spaced relation, and preferably being of triangular form to provide apertured heads 13 for bearings of a shaft 14.

Numerals 15 indicate cutter bars, these being arranged in pairs and secured midway between their ends to the shaft 14, and upon the ends of the bars of each pair are secured blades 16, each pair of cutter bars being disposed midway between the frames 12.

In order that the parts thus mentioned may be moved across a field in a manner to operate as a stalk cutter, the base-plate is connected with the tractor in a manner to permit said plate to slide or move over obstructions, such as surface undulations or hummocks, and for this purpose a pair of inclined pull-bars 17 are provided, their rear ends being pivotally connected with the plate 11 as indicated at 18, and their front ends being pivotally connected with the front axle 19 of the tractor, as indicated at 19'.

Numeral 20 indicates a radius-rod, its rear end being journaled on the shaft 14 as indicated at 21, and its front end being pivotally connected with the housing 22 of the rear axle 23, as indicated at 24.

Numeral 25 indicates a pulley which is rigidly secured to the shaft 14, and by means of a belt or equivalent member 26 engaging said pulley and engaging the engine pulley 27 of the tractor the shaft 14 may be rotated.

Numeral 28 indicates a yoke, its opposed arms *a* being provided with slots *b* for receiving the pull-bars 17, and by means of springs *c* which are disposed in these slots, said bars are normally pressed downwardly toward the lower ends of the slots. The yoke may be secured to any suitable part of the tractor, but it operates to advantage when mounted on the frame *d* of the tractor, as best shown in Fig. 7 of the drawings.

The distance between the several pairs of cutter bars should be approximately equal to the distance between the rows of stalks to be cut, and in operation, the tractor is driven in such a manner that the blades 16 will be engaged midway between their ends by the stalks of a row, and if the rows are uniformly spaced apart the stalks in the rows may be cut.

While the attachment, in the present instance, is disposed rearwardly of and to be drawn by the tractor, it may be disposed forwardly, if desired, to be pushed by the tractor across a field. Also the shaft 14 may be rotated in either direction for cutting the stalks, the cutter bars, of course, being reversed to permit the blades to engage the stalks.

It will be noted that while the rear ends of the pull-bars 17 may have limited movements upwardly or downwardly, any transverse movements of said bars relative to the tractor will be prevented by the engagement of said bars in the arms of the yoke, this being a desirable feature, and on this account when "turning about" at the ends of the rows, the base-plate 11 will have a horizontal swinging movement corresponding to the turning movement of the tractor.

It will be seen that the radius rod 20 is disposed in a plane approximately parallel with the band 26 and in a plane parallel with the pull-bars 17. This radius rod may have swinging movements upwardly and downwardly to conform to the movements of the tractor and base-plate when moving upon uneven ground, and it maintains the frames 12 in an upright position at all times, the swings c, during operation, tending to press the base-plate toward the ground so that the stalks may be cut to advantage very near to the ground, but permitting the required, limited upward and downward movements of the base-plate when moving over obstructions.

It will be noted that the base-plate has the greatest thickness midway between its longitudinal edges, its bottom, transversely, being of convexed form as indicated at e, this being a desired feature to permit sliding movements on the ground, said base-plate being disposed approximately at right angles to the line of travel.

It is well known that some kinds of stubble and, particularly, rows of corn stalks in a field, operate as a great hindrance in the work of ploughing. By use of the herein described attachment the work of cutting the stalks may be quickly accomplished; and since the construction consists of few parts it may be manufactured at a limited cost.

While I have shown many specific details of construction, I do not wish to be understood as limiting myself in this respect, and changes may be made in form, size, proportion and minor details if I find it to be of advantage, said changes being determined by the scope of the invention as claimed.

I claim as my invention,—

1. In a cutter attachment for tractors, a base-plate provided with upright frames and having a convexed bottom for engaging the ground transversely of the line of travel of the tractor, a revoluble operating-shaft having bearings in said upright frames, cutter-bars arranged in pairs at longitudinal intervals of the base-plate and rigidly mounted on said shaft, blades mounted on the ends of the cutter-bars of each pair, pull-bars connected at their respective ends with the base-plate and tractor, a radius rod having a pivotal connection with the shaft and pivotally connected with the tractor, a yoke on the tractor having arms receiving the pull-bars, and a pair of springs carried by said yoke for pressing the pull-bars toward the ground.

2. In a cutter attachment for tractors, a base-plate provided with upright frames, a revoluble operating-shaft disposed parallel with the base-plate and having bearings in said frame, cutter-bars arranged in pairs at longitudinal intervals of and secured to said shaft, a radius rod connecting the shaft with the tractor, a yoke secured to and having a pair of arms disposed equi-distant from the medial line of the tractor, and a pair of pull-bars pivotally connected with the tractor and having pivotal connections with the base-plate, a part of each pull-bar approximately midway between its ends being in engagement with an arm of said yoke.

3. In a cutter attachment for tractors, the combination with a base-plate provided with a convexed part and an upright frame and adapted to be disposed transversely of the line of travel of the tractor, of a revoluble shaft having bearings in said frame, cutter-bars carried by said shaft, a radius rod connecting said shaft with the tractor, pull-bars connecting the base-plate with the tractor, a yoke on the tractor having downwardly projecting arms provided with slots for receiving the pull-bars, and resilient means normally tending to press the pull-bars downwardly.

In testimony whereof, I have affixed my signature.

JOSEPH SPENCE.